United States Patent [19]

Nieuwenhuis

[11] 4,156,647
[45] May 29, 1979

[54] PROCESS AND APPARATUS FOR REMOVAL OF IMPURITIES FROM LIQUIDS

[76] Inventor: Garmt J. Nieuwenhuis, 3611 E. Lake Sammamish Shore La. SE., Issaquah, Wash. 98027

[21] Appl. No.: 782,521

[22] Filed: Mar. 31, 1977

Related U.S. Application Data

[63] Continuation-in-part of Ser. No. 682,454, May 3, 1976, abandoned.

[51] Int. Cl.² ............................................. B01D 23/24
[52] U.S. Cl. ............................... 210/38 B; 210/73 R; 210/75; 210/272; 210/415; 210/DIG. 30
[58] Field of Search ................... 210/38 B, 31 C, 280, 210/52, 298, 317, 500 R, 484, 291, 289, 294, 39–40, 41, 80, 407–408, 272, 413, 415, 20, 27, 75, 73 R, 28, 50, 271, 396; 426/271, 495

[56] References Cited

U.S. PATENT DOCUMENTS

| | | | |
|---|---|---|---|
| 1,689,277 | 10/1928 | Burns | 210/408 |
| 2,315,681 | 4/1943 | Weisgerber | 210/280 |
| 2,607,679 | 8/1952 | Weiss et al. | 210/407 |
| 3,029,951 | 4/1962 | Cannon | 210/298 |
| 3,212,641 | 10/1965 | Komarmy | 210/317 |
| 3,367,506 | 2/1968 | Rosaen | 210/408 |
| 3,533,940 | 10/1970 | Peniston | 210/52 |
| 3,574,509 | 4/1971 | Zentis et al. | 210/415 |
| 3,791,520 | 2/1974 | Nieuwenhuis | 210/38 B |
| 3,953,325 | 4/1976 | Nelson | 210/415 |
| 3,997,411 | 12/1976 | Pamplin, Jr. | 210/415 |

FOREIGN PATENT DOCUMENTS 87269 1/1958 Netherlands .............................. 210/407

*Primary Examiner*—Charles N. Hart
*Assistant Examiner*—Ivars Cintins
*Attorney, Agent, or Firm*—Seed, Berry, Vernon & Baynham

[57] ABSTRACT

A unit is disclosed for removal of impurities present in liquids such as waste water effluent. The unit comprises a vessel containing a loose quantity of particulate treating material for absorption or reaction with the impurities in the liquid. A wall of the unit has multiple small openings therein, each of the openings filled with a finely-divided, compacted, particulate filter material such as diatomaceous earth which is retained in the openings by one or more layers of a woven inert material such as nylon or polyester having mesh openings sufficiently small to prevent passage of the particulate filter material therethrough. The woven material is secured over the outer surface of the openings in the wall of the vessel. Means are mounted within the vessel to progressively sweep over the inner surface of the wall just out of contact therewith and over the openings in which the particulate filter material is retained to remove impurities lodged thereon and prevent blinding of the filter material by such impurities. The same means also acts to uniformly mix the particulate treating material held within the vessel. The liquid with the impurities removed, because of the pressure differential between the inside and outside of the vessel, passes through the particulate filter material retained in the small openings of the vessel and is discharged from the housing surrounding the vessel. The treating material, once spent, is replaced as necessary.

22 Claims, 3 Drawing Figures

PROCESS AND APPARATUS FOR REMOVAL OF IMPURITIES FROM LIQUIDS

This application is a continuation-in-part of Ser. No. 682,454, filed May 3, 1976, now abandoned.

BACKGROUND OF THE INVENTION

1. Field of the Invention

This invention relates to a unit for removal of impurities from liquids and to a method for doing so.

2. Description of the Prior Art

Removal of impurities from liquids such as aqueous solutions, particularly, heavy metals present in small quantities in waste water effluent, is an acute problem due to the toxicity of the heavy metals and the increasingly stringent water quality regulations regulating discharge of such materials into water bodies. In many areas, water containing small quantities of heavy metals such as chromium, lead, mercury, cadmium, beryllium, etc. cannot be discharged into municipal sewage systems without removal of the heavy metals to an extremely low level.

For other purposes, filtering of aqueous solutions is not adequate with conventional filtering devices because of the nature of the material to be filtered. For example, ferric hydroxide is a gelatinous solid which is very difficult to filter. Fruit juices containing impurities rendering the solution cloudy are also difficult to filter and clarify.

Liquids such as used motor oils, tallow, etc. are difficult to purify by conventional means.

The removal and recovery of hexavalent chromium from aqueous metal treating baths by contact of the hexavalent chromium with a lead compound to form a water-insoluble lead chromate is disclosed in U.S. Pat. No. 3,493,328. U.S. Pat. No. 3,791,520 also discloses a system for removing chromium anions present in small quantities from waste waters by contacting the waste water stream with a particulate carrier having a water insoluble lead compound adsorbed thereon, the lead compound reacting with the chromium in the waste water stream to form a water-insoluble lead chromate. The system for chromium removal disclosed in U.S. Pat. No. 3,791,520 provides an effective method of chromium removal; however, the flow rate through the system must be closely controlled to prevent "channeling" which results in inadequate removal of the chromium anions from the incoming waste water stream. In an effort to overcome the problems encountered with the unit described in U.S. Pat. No. 3,791,520, the unit disclosed and claimed herein was designed.

The use of chitin and chitosan to remove metal ions from aqueous solutions is known from U.S. Pat. Nos. 3,533,940 and 3,635,818.

SUMMARY OF THE INVENTION

It is a primary object of this invention to provide a unit for removal of impurities from liquids, the impurities generally present in small quantities, by contacting the liquid containing the impurities with a loose, particulate treating material which acts to remove the impurity from the liquid stream by reaction, by ion exchange or by adsorption, the treating material held in a vessel having a wall with multiple small openings therein, each filled with an inert, compact, finely-divided filter material retained therein.

It is a further object of this invention to provide a unit for removal of metal ions present in small quantities in waste water streams by feeding the metal ions into a vessel having multiple small-sized openings in a wall thereof filled with an inert, particulate, finely-divided filter material retained in the openings of the vessel by a fine mesh material covering the outer surface of the wall and the openings, the vessel filled with a particulate treating material which removes the metal ions contained in the aqueous stream, the metal ions retained within the vessel while the water with the ions removed passes through the particulate filter material for discharge.

It is a primary object of this invention to provide a unit for removal of impurities from non-aqueous liquids such as hydrocarbon oils, tallow, etc. by contacting the non-aqueous liquid containing the impurities with a loose, particulate treating material which acts to remove the impurity from the liquid, the treating material held in a vessel having a wall with multiple small openings therein, each filled with an inert, compact, finely-divided filter material retained therein.

It is a further object of this invention to provide a unit for removal of impurities employing means within the treating vessel to progressively sweep the inner surface of the vessel over the openings therein to prevent blinding of the filter material retained in the openings by solids and to uniformly distribute the treating material within the vessel.

It is a further object of this invention to provide a unit for removal of heavy metals present in small quantities from water streams by contact of the water stream containing the heavy metal with particulate, naturally-occurring polysaccharide polymer held within a cylindrical vessel having multiple small openings therein filled with a compact, inert, finely divided filter material.

These and other objects are accomplished by a system which comprises (1) a vessel holding a charge of a particulate treating material which acts to remove impurities from the liquid fed therein, the vessel having multiple small openings in a wall thereof filled with a compact, inert, finely-divided filter material retained in the openings by suitable means, and (2) means for repeatedly and progressively sweeping the inner surface of the vessel over the openings therein and just out of contact with the inner vessel wall to prevent blinding of the particulate filter material retained in the openings, the same means also mixing and distributing the treating material within the vessel.

DETAILED DESCRIPTION OF THE INVENTION

Aqueous streams containing heavy metal ions such as chromium, banium, lead, zinc found in waters in the plating industry can be treated with the unit disclosed to remove the metal ions to such a low level that there is no problem in discharging the resultant effluent into water bodies.

The unit may be also used to remove ferric hydroxide, phosphates, and cyanide from aqueous streams, remove impurities from water discharged from leather tanneries, filter fruit juices or wines, filter waste petroleum oils, etc.

Figure 1:
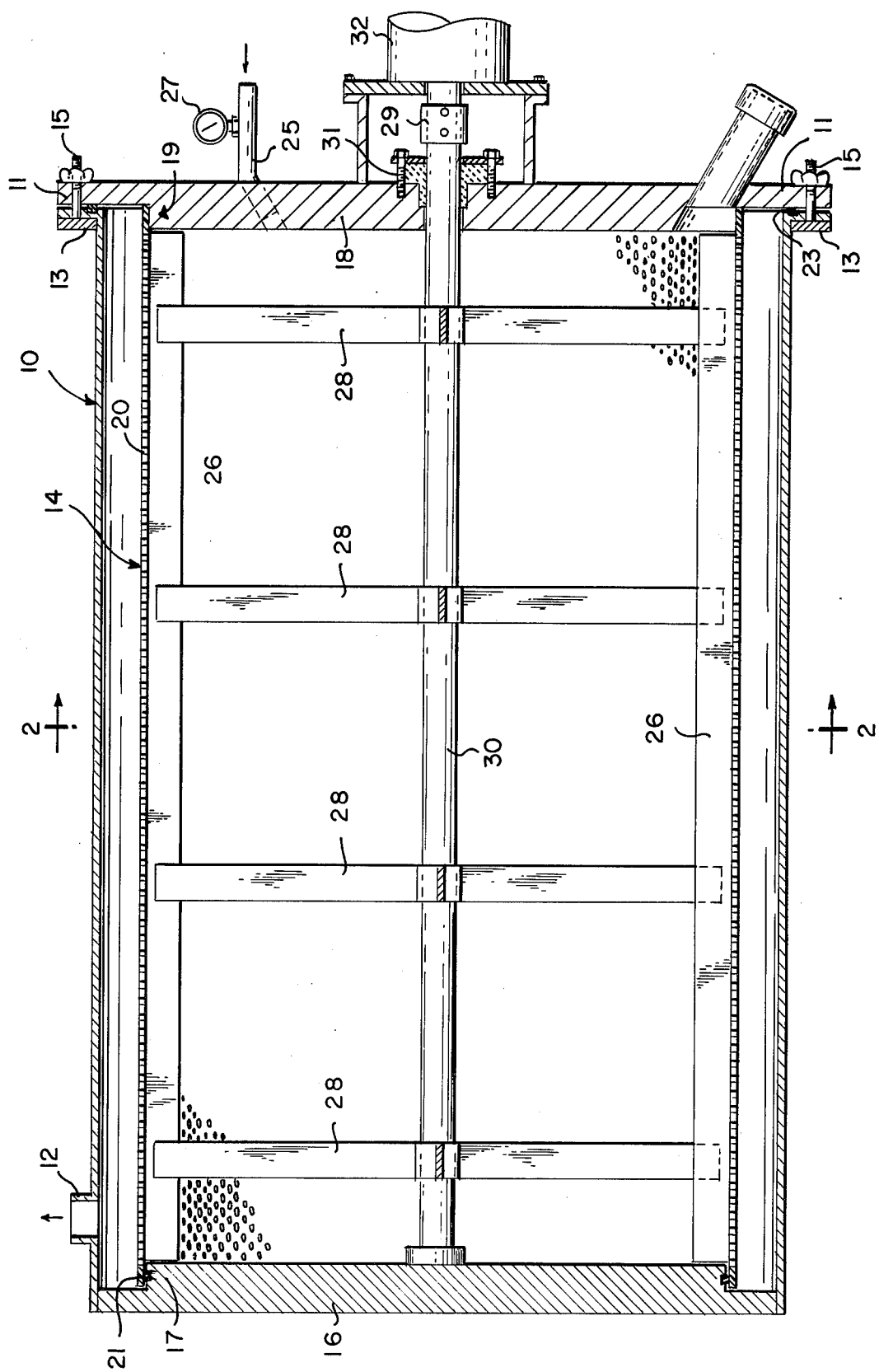
FIG. 1 is a cross-sectional view of a unit for carrying out the invention disclosed.
Figure 2:
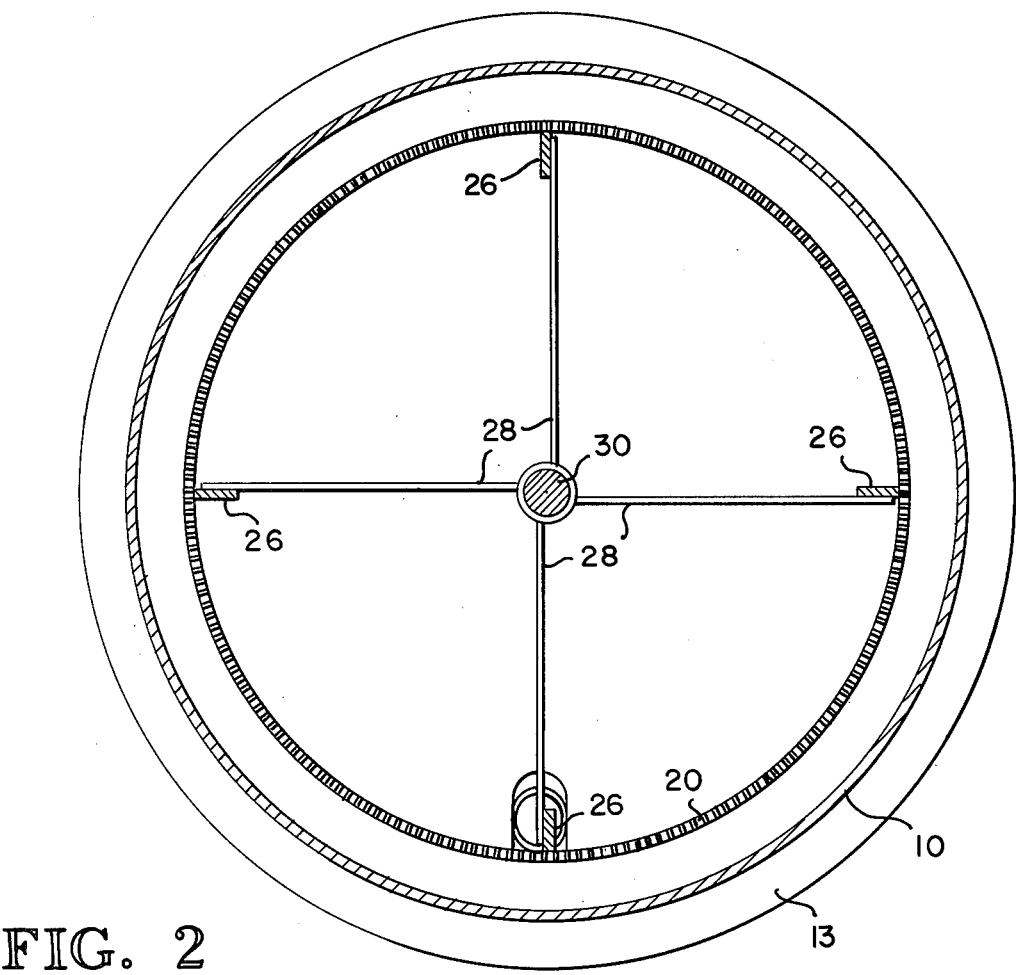
FIG. 2 is a cross-sectional view along line 2—2 of FIG. 1.
Figure 3:
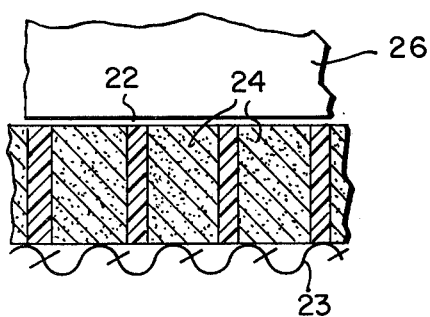
FIG. 3 is an enlarged cross-sectional view of a portion of the cylindrical vessel wall of FIG. 1 illustrating the location of the finely divided particulate material and the woven mesh material which retains the particulate material in the small openings of the cylindrical vessel.

FIG. 1 illustrates one system for removing impurities from liquids. An outer cylindrical housing 10 having end walls 16 and 18 is provided with a discharge port 12 for discharge of treated liquid after it passes into and through the openings in the wall of an inner cylindrical vessel 14. End walls 16 and 18 include shoulder portions 17 and 19 of substantially the same diameter as the inner diameter of shell 20 of the inner cylindrical vessel. The end walls 16 and 18 cap the open ends of vessel 14. O-ring 21 provides an effective seal between wall 20 and the shoulder portion 17 of end wall 16. End wall 18 includes a flange portion 11 which is secured to an integral flange portion 13 of housing 10 by suitable fastening means 15. O-ring 23 provides an effective seal between portion 13 and housing 10. Cylindrical wall 20 is secured by suitable means over the flange portion 19 of end wall 18. End wall 19 has an inlet port 25 therein for introducing the liquid to be treated into the interior of vessel 14. The inlet port may be fitted with a pressure meter 27 and/or flow meter if desired. Cylindrical wall 20 has multiple small openings 22 therein (see FIG. 3). The size of the openings may vary but preferably range from $\frac{1}{8}$ to $\frac{1}{2}$ inch in diameter. The outer housing 10, cylindrical vessel 20 and end walls 16 and 18 are preferably manufactured from a synthetic plastic material which can withstand highly acidic materials without damage thereto. The units may also be manufactured from stainless steel or other suitable metals if desired, depending on the water to be treated.

Imbedded in each of the openings 22 is a finely-divided, particulate, inert, filter material 24, such as diatomaceous earth. The particle size of the filter material is chosen depending on the solids to be retained. The particle size of the filter material 24 should be sufficiently small to prevent passage therethrough of particulate solids in the waste water. A preferred particle size is on the order of 2 to 5 microns, on the average. Too small a particle size of filter material results in too slow filter rate while too large a particle size does not effectively remove the impurities sought to be removed. To retain the filter material within the openings 22, a woven fabric 23 or other suitable material having a mesh size small enough to prevent passage of the particulate filter material therethrough is placed over the outer surface of the cylindrical shell 20 and over the openings 22. For example, a woven nylon or polyester knit cloth adhesively bonded to the outer surface of the cylindrical shell has been found to work adequately.

Mounted within the vessel are a series of blades 26 which extend substantially the length of the vessel. Each blade is secured by suitable struts 28 to a rotatable shaft 30 axially mounted in the vessel. The outer periphery of each of the blades is designed to pass over the inner openings as close as possible to the inner surface of the wall 20 without affecting the filter material 24 contained in the opening 22. The clearance between the blades and the inner surface of wall 20 is preferably about 1/64-inch. Shaft 30 extends through an opening in wall 18 and is connected to suitable power means 32, such as a hydraulic motor by a connector 29 for rotation thereof. A standard shaft packing gland 31 surrounds shaft 30 to prevent leakage through end wall 18.

For removal of hexavalent chromium from waste water solutions the interior of vessel 14 may be filled with a water-insoluble lead compound which reacts with chromium anions in the water being treated to form water-insoluble lead chromate. The lead compound used may be lead oxide, lead carbonate, lead hydroxide, or other water-insoluble lead compound. The particle size of the particulate filter material 24 retained in the openings of the cylindrical shell 20 is chosen to prevent passage of the finely divided lead chromate precipitate which forms as a result of the reaction of the water-insoluble lead compound in the vessel with the chromium anions contained in the waste water stream. The smaller the particle size of filter material used, the lower the rate of filtration. A pressure differential between the interior and exterior of vessel 14 of 3 to 6 psi is maintained for adequate filtration. It has also been found that a wall thickness of the cylindrical shell 20 should be from $\frac{1}{4}"$ to $\frac{1}{2}"$ and preferably $\frac{3}{8}"$ for optimum results. The depth of the diatomaceous earth 24 filling the openings 22 in the cylindrical shell is equal to the wall thickness. The vessel is filled with the particulate lead compound in loose form or adsorbed in the pores of a particulate carrier such as disclosed in U.S. Pat. No 3,791,280. Waste water containing small quantities of chromium anions is fed into the vessel through inlet port 25. On contact with the lead compound in the cylindrical vessel, a finely-divided water-insoluble lead chromate precipitate is formed. The water passes through the diatomaceous earth filter material 24, (FW50 with a particle size of about 1/64-inch), the diatomaceous earth preventing passage of the lead chromate precipitate therethrough. The blades 26 within the vessel are rotated at a speed sufficient to prevent blinding of the diatomaceous earth filter material 24 by the finely-divided lead chromate precipitate. The blades also continuously mix the lead compound within the vessel to prevent channeling. The water with the chromium removed is discharged from the housing 10 through port 12. If desired, monitoring means, such as a conductivity meter, may be used to continuously sample the discharge water to determine the level of chromium anions in the water being discharged. When the bed of lead within the vessel is substantially spent water-soluble chromium will pass through the filter material causing a change in the conductivity of the water being discharged. The monitor, if desired, can be connected to suitable control means to automatically discontinue feeding water into the unit or to notify an operator to take appropriate action. Two or more units can be run in tandem so that when one unit is spent the waste water to be treated can be fed into the adjacent unit. The lead chromate precipitate contained within the vessel can be recovered and sold as a pigment to the paint industry, or otherwise used.

The system disclosed is also useful for removal of other heavy metals, such as nickel, cadmium, mercury and lead present in small quantities in water streams, using a particulate treating material containing a naturally-occurring polysaccharide polymer such as chitin or chitosan as disclosed in U.S. Pat. Nos. 3,533,940 and 3,635,818. Chitin is the main structural component of lobster, shrimp and crab shells as well as the exterior skeletons of other crustaceans, insects and spiders. Chitin is composed of chains of glucose units in which one hydroxyl in every glucose fragment is replaced by acetamido group. "Chitosan", a deacylated form of chitin produced by heating chitin in aqueous acid, has similar properties to chitin. Both chitin and "Chitosan" act as ion exchange materials for the removal of heavy metals such as chromium, lead, mercury, zinc and cadmium contained in water soluble form in water streams. The cylindrical vessel 14 is filled with particulate shrimp, lobster or crab shells or other source of chitin, the chitin or chitosan acting as an ion exchange material to remove the solubilized heavy metals in the water stream fed into the vessel. The pH of the entering stream to be treated is preferably adjusted to the pH of less than about 7, such as pH 6.5. The cylindrical vessel 14 is filled with the particulate chitin polymer. The particle size of the chitin or chitosan should range between 6 and 60 mesh (U.S. Sieve Series). As mentioned earlier the small openings in the vessel wall are filled with a compact, finely-divided, particulate filter material such as idatomaceous earth. Blades within the vessel are used to uniformly mix the particulate treating material contained therein to prevent channeling and to assure uniform action of the heavy metals contained in the water stream with the treating material. As mentioned previously, the water discharged from the unit can be continuously monitored to determine the effective removal of the heavy metals contained therein. When the ion exchange properties of the chitin or chitosan have been substantially spent, the incoming water to be treated can be transferred to a second unit. The heavy metals sequestered by the treating material in the cylindrical vessel can be recovered by pyrolysis of the material. Pyrolysis is a known technique involving the heating of the bed of treating material in a closed vessel in the absence of oxygent sufficient to decompose the treating material and recover the metal.

One of the problems associated with the use of shrimp or crab shells is that they begin to smell very quickly after the meat is removed from the shells due to decay. This makes them almost impossible to use because of the odor associated therewith. It has been found that soaking the shells in a solution of 0.5 to 4 percent by weight formaldehyde prevents their decay. After soaking in formaldehyde the shells can be dried and used without any odor associated therewith.

The addition of formaldehyde or other aldehyde to the treating material also has the advantage of destroying free and/or chemically combined cyanide present in the aqueous solution to be treated, as described in U.S. Pat. No. 3,505,217.

If the aqueous stream to be treated contains gross amounts of heavy metals it is preferable to subject it to pretreatment to reduce the level of the heavy metals. For example, acid solutions such as pickle liquor solutions may be pretreated by adjusting the pH of the solution with caustic or other suitable base and preferably to around pH 6.5, and then adding sodium sulfide to precipitate out the heavy metal.

The unit may also be used in conjunction with chitin or chitosan to remove cyanide present in aqueous streams. For example, in a solution containing caustic and nickel cyanide, an aldehyde such as formaldehyde or acetaldehyde is added which reacts with and breaks down the cyanide. The pH of the solution is then preferably adjusted to around pH 6.5 and sodium sulfide added to precipitate out the heavy metal which is retained within the filter unit by the filter material 24.

The unit may also be used in conjunction with conventional filter aids (diatomaceous earth) as the treating material to filter and clarify fruit juices such as apple juice and wines. A coarser grade of diatomaceous earth is used for the treating material than for the filter material 24. For cleaning crankcase oil the unit may be filled with an acid clay as the treating material.

The embodiments of the invention in which a particular property or privilege is claimed are defined as follows:

1. A method for the removal of an impurity from a liquid containing the same comprising:
    passing the liquid containing the impurity successively into contact with a particulate, water-insoluble material which acts to remove the impurity by chemical reaction, ion exchange or adsorption, the material contained in a vessel with the liquid being treated for removal of the impurity, and then passing the liquid with the impurity removed through an inert, packed layer of particulate, finely-divided filter material retained in small openings in the vessel wall immediately adjacent the treating material, the filter material having a particle size sufficient to prevent passage therethrough of particulate solids contained in the liquid, and
    repeatedly sweeping directly adjacent the inner surface of the vessel wall over the openings in which the filter material is retained to prevent blinding of the filter material.

2. The method of claim 1 wherein the filter material retained in the openings is diatomaceous earth.

3. The method of claim 2 wherein the average particle size of the diatomaceous earth is from 2 to 5 microns and the depth of the filter material ranges from ¼ to ½ inch.

4. The method of claim 1 wherein the liquid is water, the impurity is chromium anions and the particulate, water-insoluble material is a water-insoluble lead compound chemically reactive with chromium anions to form water-insoluble lead chromate.

5. The method of claim 1 wherein the liquid is an aqueous solution, the impurity is a heavy metal and the particulate, water-insoluble material is chitin or chitosan which adsorbs and retains the heavy metal contained in the aqueous solution.

6. The method of claim 5 wherein the material is one selected from the group consisting of the particulate shells of lobster, crab and shrimp treated with a solution containing formaldehyde.

7. The method of claim 1 wherein the liquid is a fruit juice containing impurites and the material is a filter aid.

8. A system for removing an impurity from a liquid containing the same comprising:
    a vessel holding a quantity of particulate, water-insoluble material which acts to remove the impurity by chemical reaction, ion exchange or adsorption, the material contained in the vessel with the liquid being treted for removal of the impurity from the liquid, the vessel having multiple, small openings in a wall thereof,
    a packed layer of particulate, finely-divided filter material, inert with respect to the impurity being removed, in each of the openings in the vessel wall,
    means for retaining the layer of filter material in each of the openings,
    means for feeding the liquid containing the impurity to be treated into the vessel into contact with the particulate, water-insoluble material and then through the particulate, finely-divided filter material in each of the openings in the vessel wall, means in the vessel for repeatedly sweeping over the inner surfce of the vessel and openings in which the filter material is retained to prevent blinding of the filter material, and means for maintaining a pressure differential between the inside and outside of the vessel to aid in passage of the liquid through the filter material retained in the openings.

9. The system of claim 8 wherein the quantity of particulate, material is a material containing chitin.

10. The system of claim 9 wherein the chitin has a particle size ranging from 6 to 60 mesh, U.S. Sieve Series.

11. The system of claim 8 wherein the filter material is diatomaceous earth.

12. The system of claim 11 wherein the filter material has a particle size of 2 to 5 microns.

13. The system of claim 8 wherein the vessel has a cylindrical wall with closed end walls, the cylindrical wall containing multiple small openings therein in which the particulate filter material is imbedded, wherein the means for retaining the particulate filter material in the openings is a woven material covering the outer surface of the cylindrical wall of the vessel and openings and bonded thereto having a mesh size sufficiently small to prevent the particulate filter material from passing therethrough, and wherein the means for repeatedly sweeping across the inner cylindrical wall is a series of blades extending substantially the length of the vessel mounted on a rotatable shaft axially positioned within the vessel.

14. The system of claim 13 wherein the longitudinal axis of the cylindrical vessel is horizontally oriented.

15. The system of claim 8 wherein the thickness of the vessel wall and filter material is from $\frac{1}{4}''$ to $\frac{1}{2}''$ and the size of the multiple openings in the vessel wall is from $\frac{1}{8}''$ to $\frac{1}{2}''$ in diameter.

16. The system of claim 8 wherein the quantity of particulte material is a water-insoluble lead compound reactive with chromium anions in the liquid being treated to form water-insoluble lead chromate.

17. The system of claim 8 wherein the depth of the finely-divided filter material in each of the openings in the vessel wall is substantially the same as the thickness of the vessel wall.

18. The system of claim 8 wherein the means for retaining the layer of filter material in each of the multiple openings in the vessel wall is a material covering the multiple openings having a mesh size sufficient to prevent passage therethrough of the finely-divided filter material imbedded in the multiple openings of the vessel wall.

19. A system for removing an impurity contained in small quantities in an aqueous solution comprising:

an outer housing having a discharge opening therein, a cylindrical vessel mounted in the housing having spaced end walls connected by a cylindrical wall with a thickness of from $\frac{1}{4}$ to $\frac{1}{2}$ inches, the cylindrical wall having multiple openings therein around its circumferential surface ranging in size from $\frac{1}{8}$ to $\frac{1}{2}$ inches in diameter, a quantity of a particulate, water-insoluble material which acts to remove the impurity by chemical reaction, ion exchange or adsorption, the material contained in the vessel in the aqueous solution being treated for removal of the impurity in the aqueous solution, a packed, finely-divided, particulate filter material imbedded in the multiple openings of the cylindrical wall of the vessel, a woven material covering the outer surface of the cylindrical wall of the vessel and the multiple openings therein having a mesh size sufficient to prevent passage therethrough of the finely-divided filter material imbedded in the multiple openings of the cylindrical shell, means for feeding the aqueous solution containing the impurity to be treated into the vessel into contact with the particulate, water-insoluble material and then through the particulate finely-divided filter material in each of the openings in the vessel wall, a series of blades extending substantially the length of the vessel mounted on a rotatable shaft axially positioned within the vessel for repeatedly sweeping directly adjacent the inner surface of the cylindrical wall of the vessel and over the openings therein to prevent blinding of the filter material and to mix the particulate, water-insoluble material within the vessel, means for maintaining a pressure differential between the inside and outside of the vessel to aid in passage of the aqueous solution through the filter material retained in the multiple openings thereof, and power means connected to the shaft for rotation thereof.

20. The system of claim 19 wherein the filter material is diatomaceous earth.

21. The system of claim 19 wherein the particulate treating material is a lead compound selected from the group consisting of lead oxide, lead carbonate and lead hydroxide.

22. The system of claim 19 wherein the treating material is chitin.

* * * * *